(12) United States Patent
Matiash et al.

(10) Patent No.: US 6,707,004 B2
(45) Date of Patent: Mar. 16, 2004

(54) APPARATUS FOR SECURING A POWER CABLE FROM A POWER SOURCE TO A WIRE FEEDER

(75) Inventors: Nicholas A. Matiash, Oshkosh, WI (US); Jefferey R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/064,680

(22) Filed: Aug. 6, 2002

(65) Prior Publication Data

US 2004/0026393 A1 Feb. 12, 2004

(51) Int. Cl.⁷ .................................................. B23K 9/28
(52) U.S. Cl. .............................. 219/137.2; 219/137.31; 219/137.9
(58) Field of Search ..................... 219/137.63, 137.2, 219/137.31, 137.9

(56) References Cited

U.S. PATENT DOCUMENTS

| 2,935,312 A | * | 5/1960 | Kilpatrick et al. ............ 266/97 |
|---|---|---|---|
| 3,108,179 A | * | 10/1963 | Ulli ........................... 219/137.9 |
| 3,275,796 A | * | 9/1966 | Bernard et al. ........ 219/137.71 |
| 5,338,917 A | * | 8/1994 | Stuart et al. ........... 219/137.63 |
| 5,512,726 A | * | 4/1996 | Arantes et al. ........... 219/125.1 |
| 6,479,795 B1 | * | 11/2002 | Albrecht et al. ......... 219/137.2 |
| 6,596,972 B1 | * | 7/2003 | Di Novo et al. ......... 219/137.9 |

* cited by examiner

*Primary Examiner*—M. Alexandra Elve
*Assistant Examiner*—Len Tran
(74) *Attorney, Agent, or Firm*—Ziolkowski Patent Solutions Group, LLC (57) ABSTRACT

The present invention is directed to an apparatus for securing a power cable from a power source to a wire feeder of a welding system. The wire feeder includes an inlet configured to receive a de-sheathed portion of the power cable. A frame includes at least one cavity and, preferably, a pair of cavities coaxial with respect to one another and orthogonal with respect to the inlet are provided. The first cavity has a securing mechanism such as a stud or setscrew disposed therein such that the securing mechanism engages a portion of the de-sheathed cable. The securing mechanism engages the power cable to lodge a portion of the power cable within the second cavity thereby creating a secure attachment of the power cable to the wire feeder.

21 Claims, 5 Drawing Sheets

APPARATUS FOR SECURING A POWER CABLE FROM A POWER SOURCE TO A WIRE FEEDER

BACKGROUND OF INVENTION

The present invention relates generally to welding systems and, more particularly, to an apparatus for securing a power cable from a welding power source to a wire feeder.

Wire feeders are typically used to feed metal wire into a weld during a welding process such as Gas Metal Arc Welding (GMAW) and other welding processes. Typical wire feeders have a drive roller assembly for driving the metal feed from a feed spindle through a welding gun for introduction to the weld. Power is supplied to the drive roller assembly by a welding power source via a weld cable. The amperage or current generated by the power source governs the speed in which the metal feed is fed to the weld. Generally, the higher the amperage supplied to the wire feeder, the greater the speed by which the wire feeder supplies the metal filler to the weld.

Generally, the power cable extending from the power source is connected to the wire feeder via a lug terminal connection. To effectuate this connection, an end of the cable typically has a lug "crimped" securely thereon. The lug is then bolted to the wire feeder to achieve an electrical connection between the power source and the wire feeder.

Accordingly, it is desirable to design a lug-free apparatus for securing the welding cable from the power source to the wire feeder to expedite the manufacturing process and reduce costs typically associated with securing the welding cable to the wire feeder Furthermore, a lug-free connection enables the end user to fabricate custom welding cables without having to procure otherwise unnecessary equipment.

BRIEF DESCRIPTION OF INVENTION

The present invention is directed to a cable-securing apparatus for a wire feeder overcoming the aforementioned drawbacks. Accordingly, a wire feeder includes a drive assembly having an internal frame connected to a gearbox. The frame has a cable inlet in communication with a wire bore through which a weld cable may be extended. When the cable is extended through the wire bore, a stud or setscrew disposed in a cavity orthogonal to the wire bore may be manipulated so as to engage the end of the cable. The stud or setscrew is designed to exert a force on the cable so that the engaged portion of the cable is forced (at least partially) to lodge within a second cavity positioned in-line and opposite the first cavity. Preferably, the second cavity has an inlet larger than the outlet of the first cavity. That is, the second cavity is in a coaxial relationship with the first cavity with the wire bore extending therebetween.

Therefore, in accordance with one aspect of the present invention, a casting for a drive assembly of a wire feeder is provided. The casting includes a frame in operable association with a gearbox configured to translate wire through the wire feeder. The casting further Includes at least one power cable inlet positioned at one end of the frame and configured to receive a weld cable. At least one cavity is positioned at the one end of the frame and is in communication with the at least one power cable inlet. The casting further includes at least one securing mechanism removably positionable in the at least one cavity to engage a portion of the weld cable extending through the at least one power cable inlet so as to secure the weld cable to the drive assembly.

In accordance with another aspect of the present invention, a welding system includes a power source as well as a cable connected to the power source at one end. The welding system further includes a wire feeder drive assembly connected to another end of the cable wherein the wire feeder drive assembly includes an inlet configured to pass the cable therethrough. The drive assembly further includes a frame having a wire bore and a setscrew bore therein. The wire bore is positioned in line with the inlet. A setscrew lies within the setscrew bore and in communication with the wire bore to secure the cable within the wire bore.

In accordance with yet another aspect of the present invention, a drive assembly for a wire feeder is provided. The drive assembly includes a motor assembly and a gearbox cover attached to the motor assembly. A frame attachable to the gearbox cover is also provided. The frame has a wire bore configured to pass a weld cable as well as a cavity intersecting the wire bore. The apparatus further includes means disposed within the cavity for securing the cable within the wire bore.

In accordance with yet a further aspect of the present invention, a kit for retrofitting the drive assembly of a wire feeder includes an adaptor securable to a gearbox or casting of the drive assembly. The adaptor includes a cable inlet designed to receive a weld cable as well as a cavity intersecting the cable inlet. The kit further includes a setscrew positionable within the cavity and configured to lodge the weld cable in a portion of the cavity.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a cable securing apparatus and is particularly applicable for a wire feeder of a welding system. The securing apparatus includes a pair of cavities and a cable inlet wherein the cable inlet is configured to receive an unsheathed portion of a power cable and one cavity is configured to receive a securing mechanism such as a stud or threaded setscrew to engage the de-sheathed portion of the power cable so as to lodge the portion of the cable within the other cavity to effectuate attachment of the power cable. The securing mechanism structurally secures the cable to the wire feeder so as to prevent an inadvertent disconnection of the cable from the wire feeder.

The present invention will be described with respect to a wire feeder for use with welding systems such as MIG welding and flux cored welding systems. While the present invention will be described with respect to wire feeders such as model D-74S and D-74D manufactured by Miller Electric Manufacturing Co. of Appleton, Wis., the present invention is equivalently applicable to any device wherein a secure electrical cable connection is sought.

Figure 1:
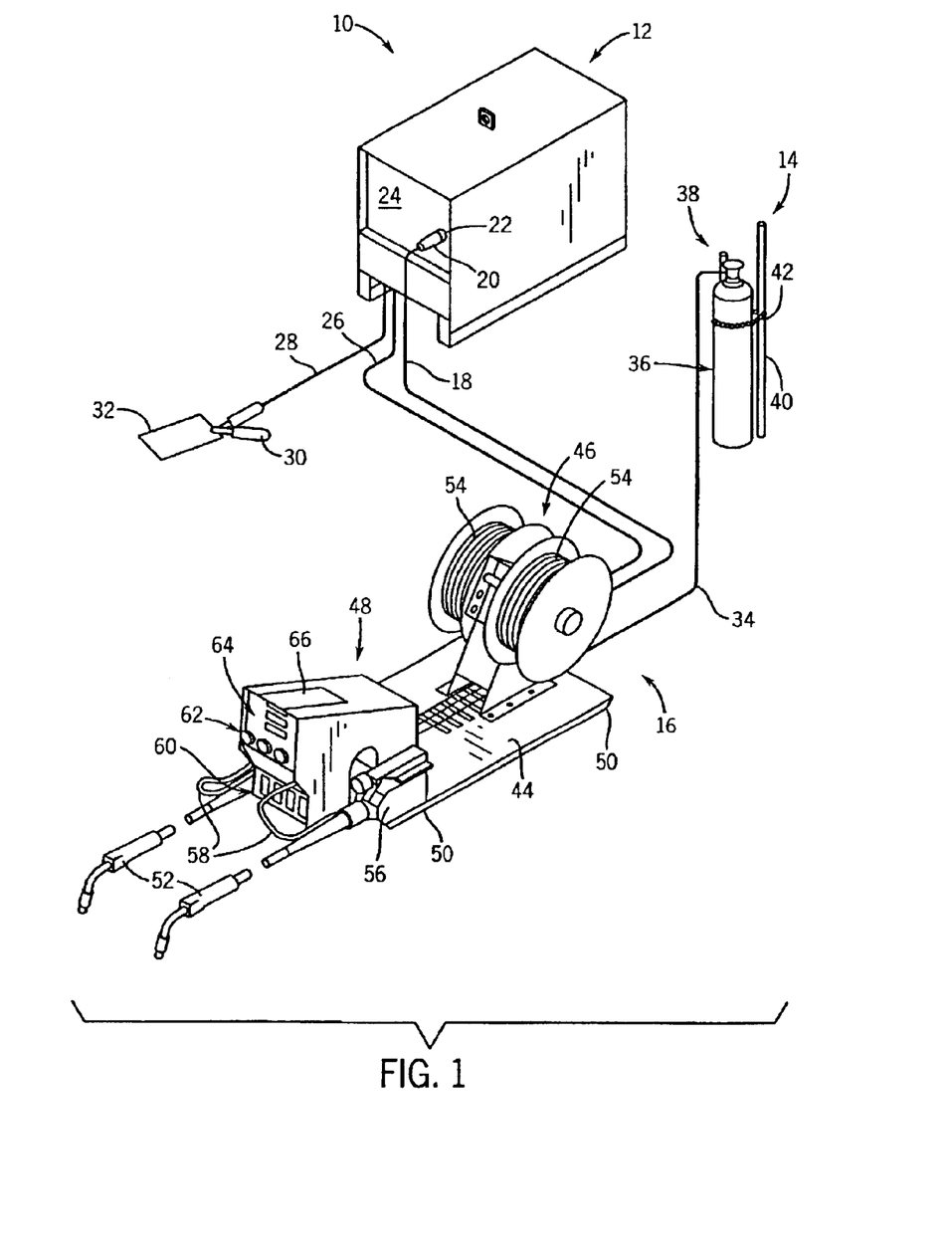
FIG. 1 is a perspective view of an assembled power source and wire feeder combination incorporating the present invention.

Referring now to FIG. 1, a welding system 10 comprises a power source 12, a gas cylinder 14, and a wire feeder assembly 16. Preferably, power source 12 is a constant voltage welding power source supplying welding arc power and 24 VAC to wire feeder 16. Wire feeder 16 is electrically connected to the power source 12 via control cable 18 wherein cable 18 includes a pin 20 that engages a corresponding nut 22 on the front panel 24 of the power source 12. Also connected between the power source 12 and the wire feeder 16 is weld cable 26. Weld cable 26 may be either a positive weld cable or a negative weld cable depending upon the particular welding process. Hereinafter, however, cable 26 will be described as a positive weld cable. As such, a negative weld cable 28 also extends from the power source 12. Negative weld cable 28 extends from power source 12 to a clamping member 30 which is configured to hold workpiece 32. Since positive weld cable 26 extends to wire feeder 16 and the negative weld cable 28 extends to workpiece 32, the requisite voltage potential between the wire feeder and workpiece necessary for welding is achieved.

Also connected to wire feeder 16 is a gas hose 34 which supplies gas for the arc-welding process from gas cylinder 36. Gas cylinder 36 includes a regulator and flow meter 38 and, in the embodiment illustrated in FIG. 1, is securely positioned against structure 40 via chain 42.

Wire feeder 16 includes a base plate 44 which is configured to support wire feed spindles 46 and control box 48. It should be noted that on the undersurface of base plate 44 are a number of rubber feet 50 that help to limit sliding of the wire feeder 16, as will be described with respect to FIG. 2. In the Illustrated embodiment, wire feeder 16 Includes two welding guns 52 which are supplied welding wire 54 stored on wire feed spindles 46 by a corresponding drive roller assembly 56. Each drive assembly 56 is connected to control box 48 via leads 58.

Control box 48 includes a number of controls 60 that are used by the welder or technician to conduct the welding process. The switches include jog/purge push buttons and an ON/OFF switch (not shown). Additional controls 62 include knobs that control the wire speed and a left/right switch 64. Affixed to the control box 48 is a label/nameplate 66 that displays information regarding model, serial number, and the like.

Figure 2:
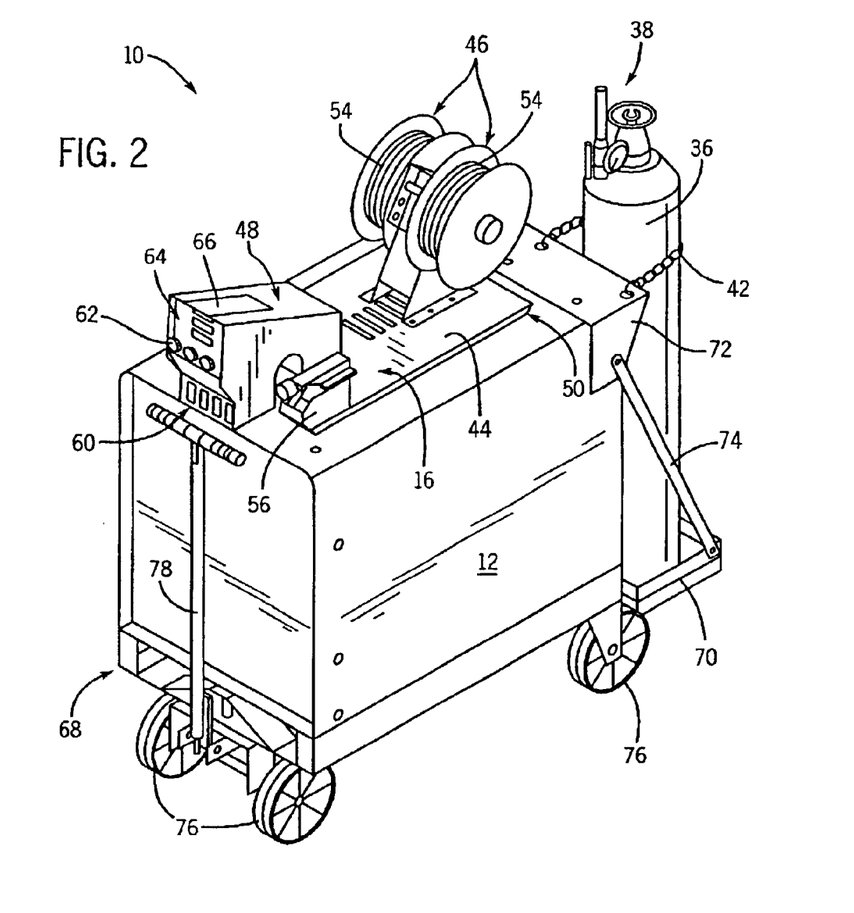
FIG. 2 is a perspective view of an assembled portable embodiment of that shown in FIG. 1.

Referring now to FIG. 2, the aforementioned welding apparatus may also be embodied in a portable system. That is, the wire feeder 16 may be positioned atop the power source 12 and jointly placed on a pull cart 68. The previously described rubber feet 50 limit sliding movement of the feeder when atop the power source 12. The pull cart may also include a cylinder support tray 70 configured to support gas cylinder 36. In this embodiment, chain 42 is secured to plate 72 which is connected to support tray 70 via crossmember 74. Plate 72 is designed to be secured to a top rear portion of power source 12. Pull cart 68 includes wheels 76 and pulling arm 78 to assist with the transportability of the welding system.

Figure 3:
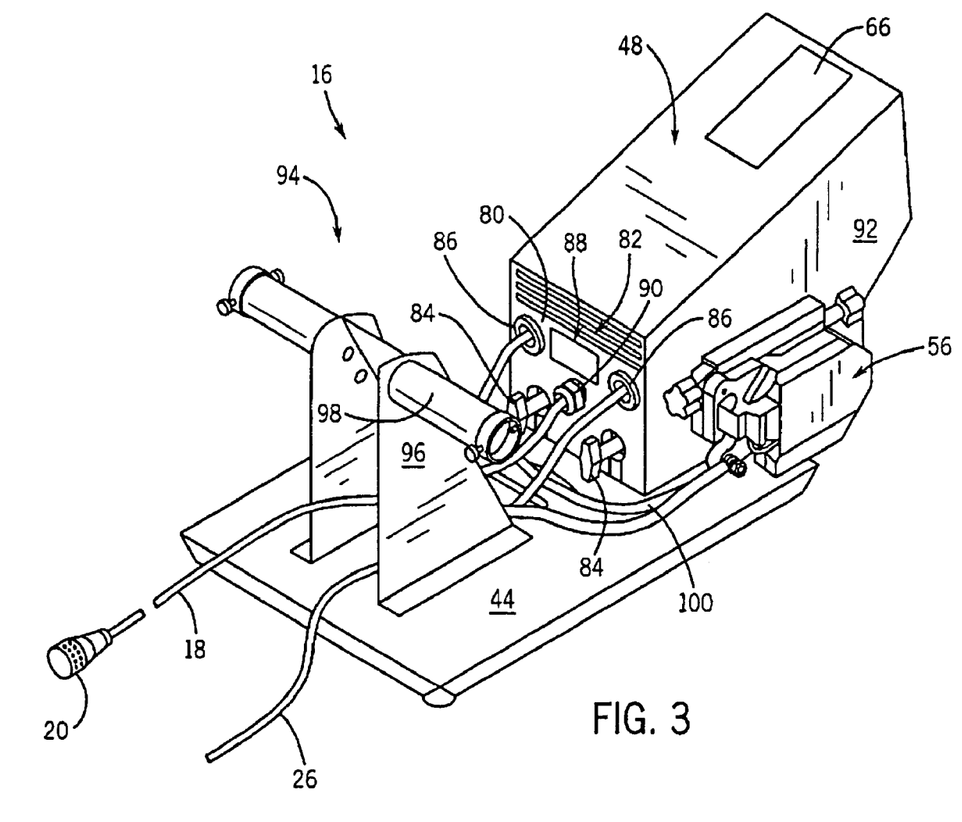
FIG. 3 is a perspective view of the wire feeder shown in FIGS. 1–2.

Referring now to FIG. 3, the rear portion of wire feeder 16 is shown. Control box 48 includes a back panel 80 having a number of cooling vents 82 and a drive assembly rotation knob 84. Also secured to back panel 80 is a pair of shielding gas valve fittings 86 each of which receives a shielding gas hose. Preferably positioned between the two shielding gas valve fittings 86 is a rating label 88. Control cable 18 is also connected to the back panel 80 via socket 90.

Mounted adjacent each side panel 92 of the control box and supported by plate 44 is a drive roller assembly 56. Each drive roller assembly 56 includes a motor and other related components, which will be described in greater detail below, that receive power from weld cable 26. Also supported by base plate 44 is a pair of structures 94 consisting of a vertical plate 96 and rod 98 that collectively support a wire spool or reel 46 (FIG. 1). It should also be noted that a jumper cable 100 extends from one drive assembly to the other drive assembly thereby providing power from the single weld cable 26 to both drive assemblies.

Figure 4:
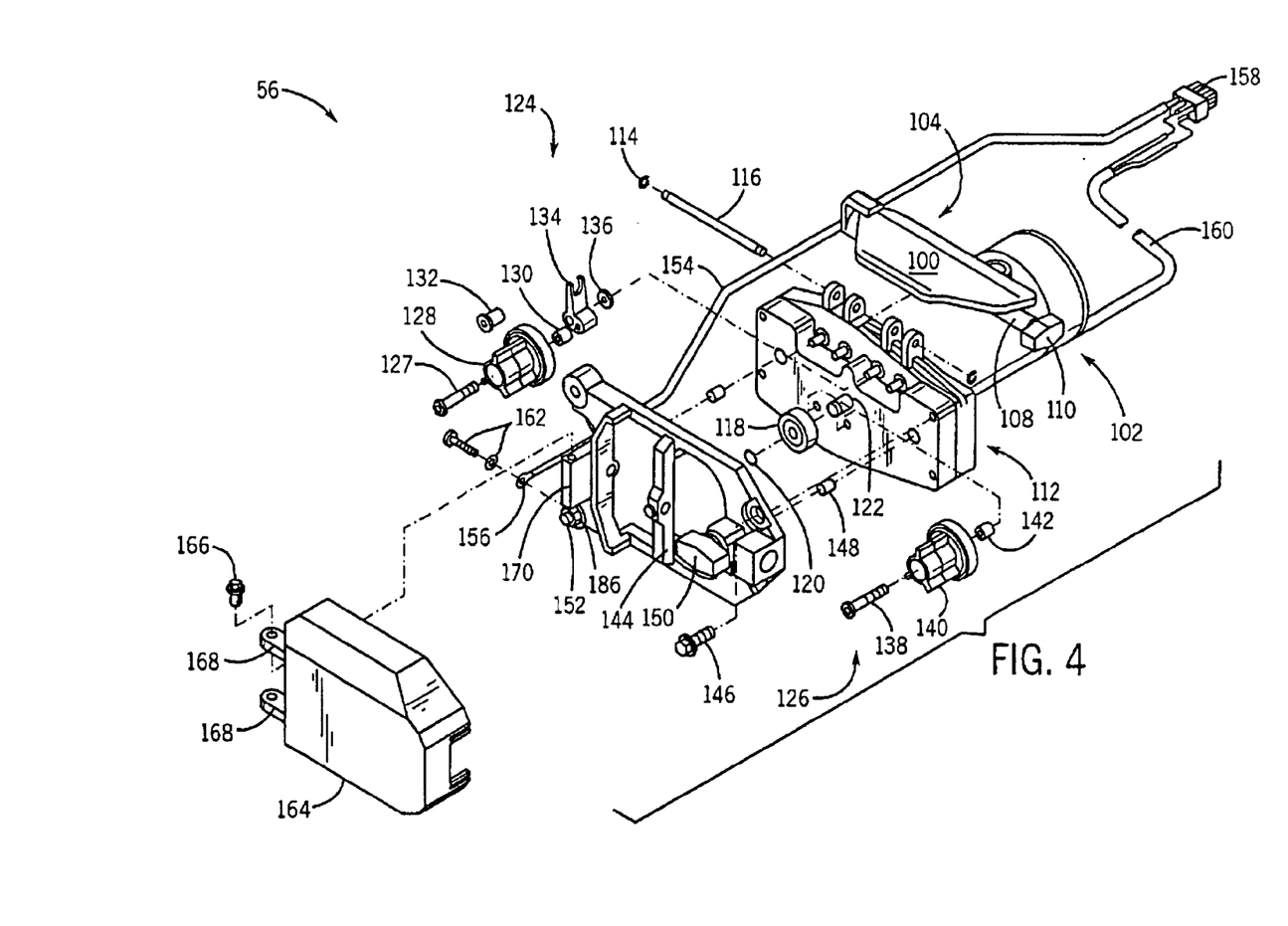
FIG. 4 is an exploded view of a drive assembly in accordance with the present invention.

Referring now to FIG. 4, the drive assembly 56 in accordance with the present invention will be described in greater detail. Drive roller assembly 56 includes a motor 102 having a pressure assembly 104 secured thereto. The pressure assembly includes a flap 106, a shaft 108, and a knob 110. In one embodiment, the motor is a one-eighth horsepower, at 24 volt DC motor. At one end of motor 102 is a gearbox cover 112 that is built thereon. Fastened to gearbox cover 112 is a pinion drive 118 and a retaining ring 120. Drive pinion 118 and ring 120 are securely fastened to shaft 122. Also secured to the gearbox are a number of carriers 124 and 126. Carrier 124 is comprised of screw 127 which is mounted within carrier 128 to securely fasten spacer 130, rocker pin 132, arm 134, and spacer 136 to gearbox cover 112. Drive carrier 126 also includes a screw 138 which secures carrier 140 and spacer 142 to the gearbox cover 112. While only one of each of the aforementioned drive roll carriers is shown, preferably, two carriers of each type are attached to the gearbox.

Also attached to the gearbox 112 is casting 144. Casting 144 is secured to the gearbox 112 via bolts 146. A locator 148 helps to locate the position of the casting 144. A spacer S is located on the back side of casting 144 which electrically isolates the casting and is also used to create some separation between the gearbox and the casting. Connected to casting 144 is knob 150. As will be described in greater detail with respect to FIGS. 5–6, a setscrew 152 engages a cavity 186 of casting 144. Setscrew 152 is designed to engage a portion of the weld cable so as to securely attach the weld cable to the casting 144. The main power for the welding arc may be transferred through the casting and into the gun where it is carried up to the weld. Some applications require a transfer of power from the weld cable to the drive assembly. This is accomplished with wire 154 having an eyelet 156 at one end. Wire 154 is secured to the casting 144 via screw and washer assembly 162.

Wire 154 then communicates with plug 158 which also includes wire 160 thereby completing an electrical circuit with the motor 102. To protect the internal components of the drive assembly, a cover 164 is connected to casting 144 via screw 166 and extension member 168 which is aligned with corresponding extension 170 mounted to casting 144.

Figure 5:
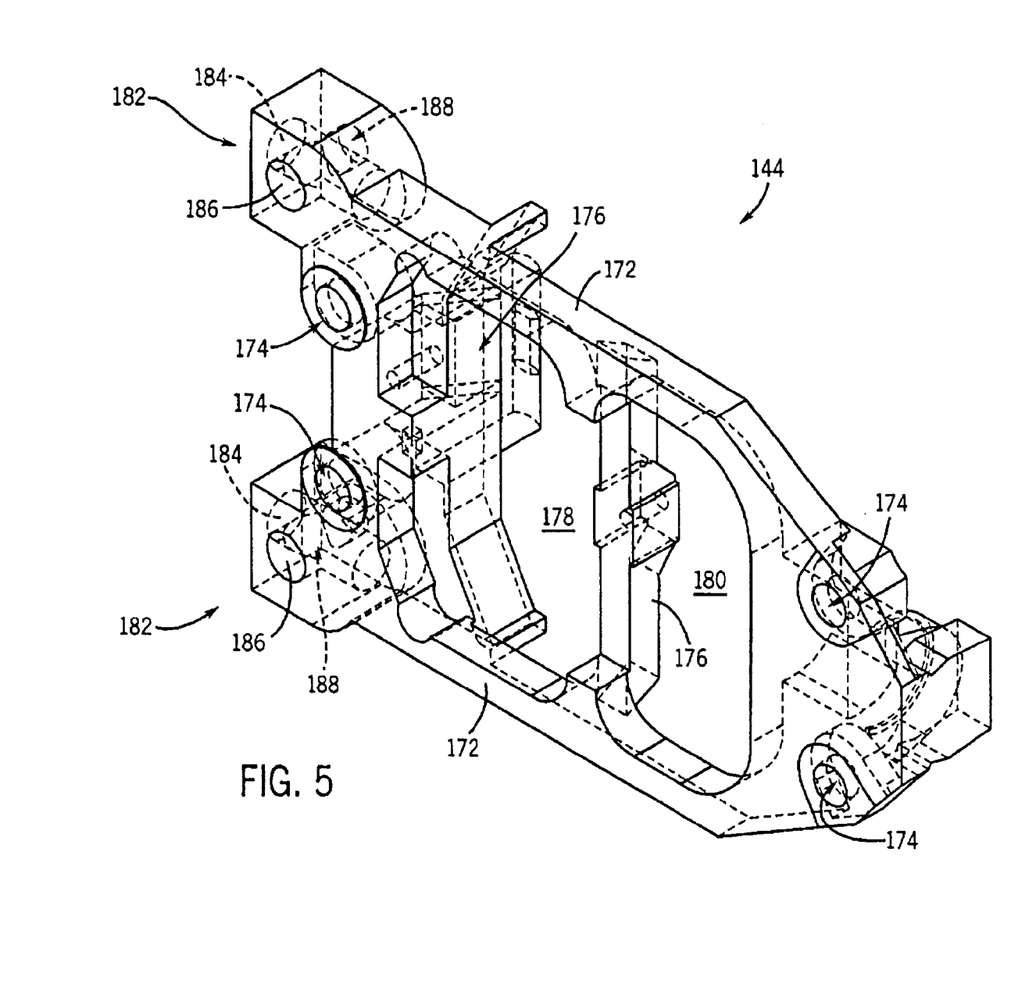
FIG. 5 is a perspective view of a casting in accordance with the present invention.

Referring now to FIG. 5, a perspective view of casting 144 in accordance with the present invention is shown. Casting 144 includes frame 172 which, as previously described, is mounted to the gearbox of the motor assembly using screws or bolts that are inserted through bores 174. Frame 172 further includes cross-member 176 which divides the internal space of the casting into sections 178 and 180. Each section 178, 180 is sized so as to provide room for the corresponding drive rollers of the drive assembly.

Casting 144 further includes a pair of securing chambers 182 each of which includes a wire bore defined by weld cable inlet 184 and a cavity 186 that orthogonally intersects cable inlet 184. That is, an intersection 188 of the cable inlet 184 and cavity 186 results which will be used to secure the weld cable to the casting.

Figure 6:
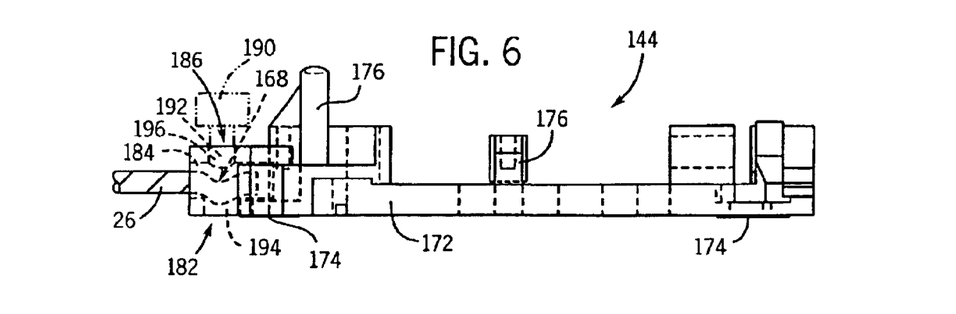
FIG. 6 is a side elevational view of that shown in FIG. 5.

Referring now to FIG. 6, a side elevational view of that shown in FIG. 5 is illustrated. As shown in phantom, weld cable 26 extends into inlet 184 such that a portion of the weld cable 26 extends past the intersection 188 of inlet 184 and cavity 186. As such, a setscrew or stud 190 may be inserted through a top portion or volume 192 of cavity 186 such that a portion of the weld cable 26 is forced into or lodged within a bottom portion or volume 194 of cavity 186. Accordingly, if a setscrew as opposed to a stud is used to secure the weld cable within cavity 186, top portion 192 of cavity 186 includes a series of threads 196 that engage corresponding grooves of the setscrew it should be noted that the cross-sectional diameter of the top portion 192 is, preferably, smaller than the cross-sectional diameter of bottom portion 194. Further, top portion or volume 192 and bottom portion or volume 194 have a co-axial relationship with respect to one another as well as share a common vertical axis. By positioning cavity 186 to intersect the cable inlet 184, it is possible to securely position weld cable 26 within the bottom portion 194 of cavity 186.

In an alternate embodiment, casting 144 may be fabricated as an adaptor securable to a gearbox to retrofit a drive assembly to achieve the advantages of the present invention heretofore described.

Therefore, in accordance with one embodiment of the present invention, a casting for a drive assembly of a wire feeder is provided. The casting includes a frame in operable association with a gearbox configured to translate wire through the wire feeder. The casting further includes at least one power cable inlet positioned at one end of the frame and configured to receive a weld cable. At least one cavity is positioned at the one end of the frame and is in communication with the at least one power cable inlet. The casting further includes at least one securing mechanism removably positionable in the at least one cavity to engage a portion of the weld cable extending through the at least one power cable inlet so as to secure the weld cable to the drive assembly.

In accordance with another embodiment of the present invention, a welding system includes a power source as well as a cable connected to the power source at one end. The welding system further includes a wire feeder drive assembly connected to another end of the cable wherein the wire feeder drive assembly includes an inlet configured to pass the cable therethrough. The drive assembly further includes a frame having a wire bore and a setscrew bore therein. The wire bore is positioned in line with the inlet. A setscrew lies within the setscrew bore and in communication with the wire bore to secure the cable within the wire bore.

In accordance with yet another embodiment of the present invention, a drive assembly for a wire feeder is provided. The drive assembly includes a motor assembly and a gearbox cover attached to the motor assembly. A frame attachable to the gearbox cover is also provided. The frame has a wire bore configured to pass a weld cable as well as a cavity intersecting the wire bore The apparatus further includes means disposed within the cavity for securing the cable within the wire bore.

In accordance with yet a further aspect of the present invention, a kit for retrofitting the drive assembly of a wire feeder includes an adaptor securable to a gearbox of the drive assembly. The adaptor includes a cable inlet designed to receive a weld cable as well as a cavity intersecting the cable inlet. The kit further includes a setscrew positionable within the cavity and configured to lodge the weld cable in a portion of the cavity.

As indicated previously, the present invention has been described with particularity to a wire feeder of a welding system. However, the present invention is equivalently applicable to other machines and systems wherein a secure electrical connection is sought. That is, the present invention may be utilized in other devices wherein a user may insert a de-sheathed portion of a cable into a cavity and secure the cable within the cavity by activating a setscrew so as to lodge the cable in a second cavity orthogonally positioned with respect to the first cavity.

The present invention has been described in terms of the preferred embodiment, and it is recognized that equivalents, alternatives, and modifications, aside from those expressly stated, are possible and within the scope of the appending claims.

What is claimed:

1. A casting for a drive assembly of a wire feeder, the casting comprising:
   a frame in operable association with a gear box configured to translate wire through the wire feeder;
   at least one power cable inlet positioned at one end of the frame and configured to receive a weld cable;
   at least one cavity positioned at the one end of the frame and in communication with the at least one power cable inlet; and
   at least one securing mechanism removably positionable in the at least one cavity to engage a portion of the weld cable extending through the at least one power cable inlet so as to secure the weld cable to the drive assembly.

2. The casting of claim 1 wherein the at least one cavity includes a first cavity and a second cavity that intersect the at least one power cable inlet, the first cavity having a threaded interior surface.

3. The casting of claim 2 wherein the at least one securing mechanism includes a setscrew engageable with the threaded interior surface of the first cavity.

4. The casting of claim 2 wherein the first cavity has a cross-sectional diameter less than a cross-sectional diameter of the second cavity.

5. The casting of claim 4 wherein the second cavity is positioned coaxial to the first cavity.

6. The casting of claim 2 wherein the second cavity is configured to receive a portion of the weld cable, the portion of the weld cable being directed into the second cavity by the at least one securing mechanism so as to lodge the portion of the weld cable in the second cavity.

7. The casting of claim 2 wherein the first and the second cavity share a common vertical axis.

8. A welding system comprising:
   a power source;
   a cable connected to the power source at one end; and
   a wire feeder drive assembly connected to another end of the cable, the wire feeder drive assembly having:
   an inlet configured to pass the cable therethrough;
   a frame having a wire bore and a setscrew bore therein, the wire bore being in line with the inlet; and
   a setscrew within the setscrew bore and in communication with the wire bore to secure the cable within the wire bore.

9. The welding system of claim 8 wherein the setscrew bore includes a first cavity orthogonal to the wire bore.

10. The welding system of claim 9 wherein the setscrew bore includes a second cavity in line with the first cavity and orthogonal to the wire bore, the second cavity configured to receive a portion of the cable when under a force applied by the setscrew.

11. The welding system of claim 10 wherein the first cavity has a diameter smaller than a diameter of the second cavity.

12. The welding system of claim 10 wherein the first cavity and the second cavity intersect the wire bore.

13. A drive assembly for a wire feeder, the drive assembly comprising:
   a motor assembly;
   a gearbox cover attached to the motor assembly;
   a frame attachable to the gearbox cover, the frame including:
      a wire bore configured to pass a weld cable;
      a cavity intersecting the wire bore; and
      means disposed in the cavity for securing the cable within the wire bore.

14. The drive assembly of claim 13 wherein the means for securing includes a threaded setscrew reciprocally engageable within the cavity.

15. The drive assembly of claim 14 wherein the cavity includes a first volume and a second volume and wherein the tube extends orthogonally between the first and the second volumes.

16. The drive assembly of claim 15 wherein the second volume has a cross-sectional diameter less than a cross-sectional diameter of the first volume.

17. The drive assembly of claim 14 wherein the means for securing the cable includes means for forcing a portion of the cable into a lower portion of the cavity.

18. A kit for retrofitting a drive assembly of a wire feeder, the kit comprising:
   an adaptor securable to a gearbox of the drive assembly, the adaptor having a cable inlet configured to receive a weld cable and a cavity intersecting the cable inlet; and
   a setscrew positionable within the cavity and configured to lodge the weld cable in a position of the cavity.

19. The kit of claim 18 further comprising a wire configured to be in electrical contact with the weld cable and configured to transfer energy to a motor of the drive assembly.

20. The kit of claim 19 wherein the wire includes an eyelet configured to pass the weld cable therethrough.

21. The kit of claim 18 wherein the intersection of the cable inlet and the cavity defines a first volume and a second volume and wherein the setscrew is positionable in the first volume and configured to apply a force to the weld cable so as to lodge a portion of the weld cable in the second volume.

* * * * *

UNITED STATES PATENT AND TRADEMARK OFFICE
CERTIFICATE OF CORRECTION

PATENT NO. : 6,707,004 B2  Page 1 of 1
APPLICATION NO. : 10/064680
DATED : March 16, 2004
INVENTOR(S) : Matiash et al.

It is certified that error appears in the above-identified patent and that said Letters Patent is hereby corrected as shown below:

On the title page at (75) delete "Jefferey" and substitute therefor -- Jeffery --;

Col. 4, line 38, delete "S" and substitute therefor -- 5 --;

Col. 5, line 18, insert -- . -- after "setscrew";

Col. 5, line 18, delete "it" and substitute therefor -- It --.

Signed and Sealed this

Eighth Day of January, 2008

JON W. DUDAS
*Director of the United States Patent and Trademark Office*